(12) United States Patent
Ozanne et al.

(10) Patent No.: US 9,439,534 B2
(45) Date of Patent: Sep. 13, 2016

(54) PROGRAMMING CONNECTOR FOR BEVERAGE CAPSULES, BEVERAGE CAPSULES AND KIT OF CAPSULES AND PROGRAMMING CONNECTORS

(75) Inventors: Matthieu Ozanne, Champanges (FR); Didier Vuagniaux, Gimel (CH); Alexandre Kollep, Lutry (CH); Gilles Gerber, Lutry (CH)

(73) Assignee: Nestec S.A., Vevey (CH)

( * ) Notice: Subject to any disclaimer, the term of this patent is extended or adjusted under 35 U.S.C. 154(b) by 671 days.

(21) Appl. No.: 13/805,915

(22) PCT Filed: Jun. 30, 2011

(86) PCT No.: PCT/EP2011/061010
§ 371 (c)(1),
(2), (4) Date: Dec. 20, 2012

(87) PCT Pub. No.: WO2012/001106
PCT Pub. Date: Jan. 5, 2012

(65) Prior Publication Data
US 2013/0095214 A1    Apr. 18, 2013

(30) Foreign Application Priority Data

Jun. 30, 2010 (EP) .................... 10167910

(51) Int. Cl.
*A47J 31/44* (2006.01)
*A47J 31/40* (2006.01)
*A23L 2/00* (2006.01)
*B65D 85/804* (2006.01)

(52) U.S. Cl.
CPC .............. *A47J 31/4492* (2013.01); *A23L 2/00* (2013.01); *A47J 31/407* (2013.01); *B65D 85/8043* (2013.01)

(58) Field of Classification Search
CPC ..... A47J 31/407; A47J 31/4492; A23L 2/00; B65D 85/8043
See application file for complete search history.

(56) References Cited

U.S. PATENT DOCUMENTS

| 6,820,535 B2 | 11/2004 | Fischer |
| 2007/0203587 A1 | 8/2007 | Erlandsson et al. |
| 2008/0302251 A1* | 12/2008 | Rijskamp et al. ............... 99/295 |
| 2010/0132564 A1* | 6/2010 | Ozanne et al. ................. 99/275 |

FOREIGN PATENT DOCUMENTS

| DE | 202006007056 | 10/2006 |
| EP | 1950150 | 7/2008 |
| WO | 2009130311 | 10/2009 |

* cited by examiner

Primary Examiner — Erik Kashnikow
Assistant Examiner — Chaim Smith
(74) Attorney, Agent, or Firm — K&L Gates LLP

(57) ABSTRACT

The present invention proposes a kit, comprising:—at least a capsule (10) for insertion in a beverage production machine and containing beverage ingredients, the capsule having a cup-like base body (10b) comprising an outlet face (10c), and—one or more beverage production parameter programming connector(s) (1) comprising an identification member (2) placed on a first side (1a) of the connector designed for representing individual information as to beverage production parameters upon mechanical contact by sensing means (8, 18) of a beverage production machine (100), said side being opposite to the second connector side (1b) designed for connection to the outlet face (10c) of the capsule, wherein either the capsule(s) (10) or the connector(s) (1) or the both is provided with means for mechanically associating the connector(1) to the capsule (10) by the consumer, preferably without using tools.

16 Claims, 5 Drawing Sheets

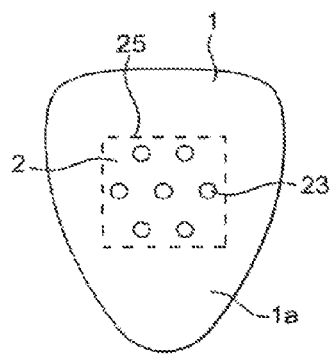
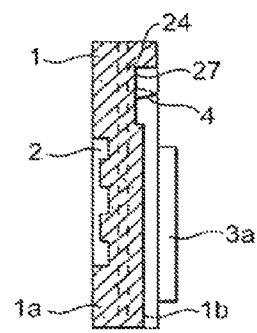
FIG. 3A          FIG. 3B
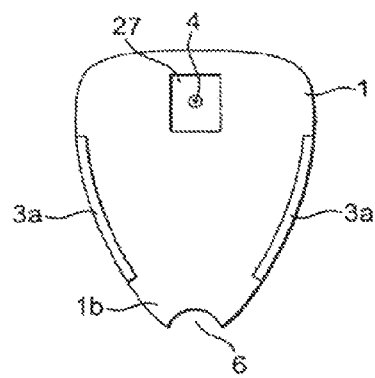
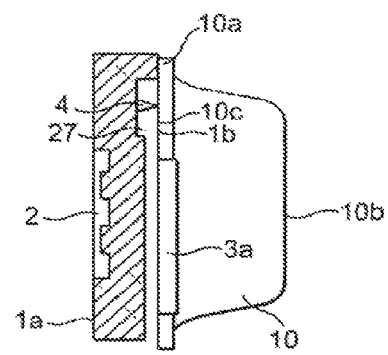
FIG. 3C          FIG. 3D

PROGRAMMING CONNECTOR FOR BEVERAGE CAPSULES, BEVERAGE CAPSULES AND KIT OF CAPSULES AND PROGRAMMING CONNECTORS

CROSS REFERENCE TO RELATED APPLICATIONS

The present application is a National Stage of International Application No. PCT/EP2011/061010, filed on Jun. 30, 2011, which claims priority to European Patent Application No. 10167910.8, filed Jun. 30, 2010, the entire contents of which are being incorporated herein by reference.

FIELD OF THE INVENTION

The invention generally relates to the field of producing a liquid comestible or beverage from ingredients contained in a capsule. More particularly, the invention relates to a programming connector to be used in conjunction with capsule based beverage systems for independently providing additional programming means to such a system.

BACKGROUND OF THE INVENTION

In the recent past beverage ingredient containing capsules have found widespread application for producing different types of beverages, such as for example tea or coffee, and other liquid comestibles. These capsules are designed for a use in connection with a dedicated beverage production device that is provided with means for feeding a liquid into the interior of the capsule such that the liquid interacts with the ingredients contained in the capsule, the result of the interaction being a produced beverage or other liquid comestibles.

Thereby, it is known that in particular the quality and/or appearance of the resulting beverage strongly depend on the operation parameters of the beverage production device used in conjunction with the capsule. Therefore, some of the known machines are provided with sophisticated control systems setting all kind of operation parameters for the beverage production process. These parameters can include e.g. the temperature and the volume of the liquid supplied to the interior of the capsule as well as the time duration of the interaction of the liquid with the ingredients contained to the capsule.

It is further known, that capsules can be provided with identification means in order to enable the beverage production machine to identify the capsule within the device and set the operational parameters accordingly. WO 2007/072413 also discloses cartridges for preparing beverages comprising a beverage ingredient container associated to a connector wearing a recognition code. The recognition code can provide information about the brewing method. The connector is also configured for receiving a fluid and mixing and/or brewing the beverage ingredient and the fluid within its body.

EP 1 950 150 for example proposes a beverage ingredient capsule that is provided with an identification member designed for being mechanically contacted from sensing means of a device in order to control operation parameters of an associated beverage production machine.

However, the known identification means of the prior artS suffer the disadvantage that the identification means are directly associated to each capsule during manufacturing. Thereby, since individual identification means have to be provided to the capsule, dependent for example on the large variety of ingredients and/or size of the respective capsule, the manufacturing process of the capsule and the identification means is very complex and costly.

Besides in 2007/072413 due to the mixing of the fluid and the beverage ingredient inside the connector body, the latter must be thrown away after it has been used for hygienic issues.

Accordingly, a problem of the present invention is to provide identification means which enables the provision of such identification means independent of the capsule manufacturing process. Furthermore, it is desired to provide reliable capsule identification means to a beverage preparation system that can be produced in a cost-effective manufacturing process.

Moreover, particularly in the field of capsules containing tea respectively leaf tea, it has been found that the consumers can be reluctant with regard to predefined operational parameters of the beverage preparation system. This is due to the fact that specifically tea consumers seem to attach great importance to the individual beverage production parameters that highly influence the quality and the flavor of the resulting tea beverage. Therefore, there is a need to provide individual identification respectively programming means that enable the consumer to choose the preparation parameters to be applied for a specific beverage to be prepared independently of predefined parameters of a beverage production machine.

Moreover, there exists a desire of the consumer to customize his/her preferences in terms of beverage preparation respectively process parameters like temperature, cup size, strength of the beverage, brewing time, flow rate of the liquid etc., associated to the identification means.

These objects are solved by means of the features of the independent claims. The dependent claims develop further the central idea of the invention.

OBJECT AND SUMMARY OF THE INVENTION

In a first aspect the present invention relates to a beverage production parameter programming connector comprising:
  connection for mechanically associating the connector to the outlet face of a capsule containing beverage ingredients,
  an identification member placed on a first side of the connector designed for representing individual information as to beverage production parameters upon mechanical contact by sensing means of a beverage production machine, said side being opposite to the second connector side designed for connection to the outlet face of the capsule.

The connector can comprise a traversing hole or an hollowing out for enabling beverage prepared in the capsule to pass the connector and to be delivered.

In a preferred embodiment the connector surface does not cover the whole capsule outlet face, most preferably does not cover the bottom side of the capsule outlet face.

In a particular embodiment the connector can comprise opening means provided at the second connector side suitable for opening the outlet face of a capsule. Such an opening means can be needle or a pointed element.

The programming connector according to the invention may however be also used in conjunction with capsules already having identification means fixedly associated to it as for example described in EP 1950150. Thereby, the programming connector may be specifically designed to be associated to these capsules. Hence, even though the capsules are already equipped with identification means, the programming connector may be associated to such a capsule in order to customize the beverage to be produced to individual preferences of the consumer with regard to the beverage production parameters.

In a second aspect the present invention relates to a capsule for insertion in a beverage production machine and containing beverage ingredients, the capsule having a cup-like base body comprising an outlet face, the capsule comprising means for mechanically associating a beverage production parameter programming connector to the outlet face of the capsule.

The associating means are usually configured for associating the beverage production parameter programming connector to the outlet face of the capsule by the consumer, preferably without using tools.

The outlet face of the capsule can present at least one hole for evacuating the beverage from the capsule. The outlet face of the capsule can be a filter or a connector with at least one overflow aperture.

According to an embodiment the means for mechanically associating a beverage production parameter programming connector to the capsule can comprise at least a snatch member or a connection groove.

According to another embodiment the means for mechanically associating a beverage production parameter programming connector to the capsule is an adhesive.

The means for mechanically associating a beverage production parameter programming connector to the outlet face of the capsule can be a reces set back from the capsule outlet surface for positioning the connector.

According to a third aspect the invention relates to a kit, comprising:
- at least a capsule for insertion in a beverage production machine and containing beverage ingredients, the capsule having a cup-like base body comprising an outlet face, and
- one or more beverage production parameter programming connector(s) comprising an identification member placed on a first side of the connector designed for representing individual information as to beverage production parameters upon mechanical contact by sensing means of a beverage production machine, said side being opposite to the second connector side designed for connection to the outlet face of the capsule, wherein either the capsule(s) or the connector(s) or the both is provided with means for mechanically associating the connector to the capsule by the consumer, preferably without using tools.

The kit can comprise several programming connectors so that the customer can change the brewing parameters, e.g. according to the type of ingredient, preferably tea. Accordingly, the programming connector provides individually applicable identification means for any given capsule of the kit. Hence, a customer is enabled to independently associate a desired programming connector to any capsule of the set to be used in conjunction with a beverage production machine in order to set the beverage production parameters of the beverage production machine to be used in conjunction with a particular capsule. The kit preferably comprises a large variety of different programming connectors that can be chosen by the customer to be associated to a particular capsule. Thereby, the programming connectors preferably comprise at least different identification members which represent different information regarding the process respectively beverage production parameters used for preparing a beverage in conjunction with the programming connector.

Moreover, the kit preferably comprises a large variety of different capsules that preferably differ at least in the amount and/or nature of ingredients contained within the capsule.

The term "without using tools" means that the user may associate the capsule and the programming connector of the kit essentially without the help of any additional means which are to be provided to the kit such as a mechanical press or a specific association tool. Hence, a convenient association of the capsule and the programming connector of the kit is enabled.

It is to be understood that the capsule according to the present invention may contain any beverage ingredient, suitable for interacting with liquid provided to the capsule in order to produce a cold or hot beverage. In particular, the capsule may contain ingredients such as e.g. coffee or coffee type ingredients, tea or the like. It should be understood that in the present application, the term 'tea' encompasses all type of leaf tea such as green tea, black tea, white tea, chai tea, flavoured tea and herbal or fruit tea. Moreover, the term 'leaf tea' or 'leaf ingredient' refers to brewable tea or other ingredients in whatever form such as complete, cut or chiselled leaves, small fragments of leaves, powder or dust.

The capsules of the kit comprise a cup-like base body having an aperture such that ingredients can be filled to the interior defined by the body of the capsule. The aperture of the body of the capsule is preferably surrounded by a circumferentially arranged flange-like rim portion to which an outlet face is sealed. The capsule of the kit is thus of a rather simple structure that enables a cost-effective manufacturing process thereof.

The outlet face of the capsule of the kit can present at least one hole for evacuating the beverage from the capsule. The outlet face of the capsule can be a filter or a connector with at least one overflow aperture.

Generally the connector is a separate element from the capsule designed to be selectively applicable to the capsule. Generally the is designed to provide adjustable programming means independent of the capsule size, ingredients of the capsule and/or predefined beverage production parameters of a beverage production machine to be used for the beverage preparation in conjunction with the capsule. Accordingly, the customer may chose the programming connector to be associated to a specific capsule in order to be thus used for the beverage production in conjunction with a suitable beverage production device such that his/her individual preferences in terms of beverage preparation respectively process parameters like temperature, cup size, strength of the beverage, brewing time, flow rate of the liquid etc., associated to the programming connector can be met.

The connector can comprise a traversing hole or a hollowing out for enabling beverage prepared in the capsule to pass the connector and to be delivered. In a preferred embodiment, the hole is provided in an outer circumferential portion of the programming connector suitable for evacuating liquid respectively a beverage provided in a space between the capsule and the programming connector.

According to an embodiment the connector surface does not cover the whole capsule outlet face, preferably does not cover the bottom side of the capsule outlet face. Thereby, the geometrical shape of the programming connector may vary to fit a large variety of different capsule sizes.

The connector can comprise opening means provided at the second connector side suitable for opening the outlet face of the capsule of the kit. The outlet face may be a soft membrane which can be pierced thus creating an aperture. Thereby, the opening means are preferably designed to create an opening in a face near a top portion of the capsule (according to its orientation in the machine). Hence, an overflow aperture within the capsule from which the resulting beverage may be drained can be provided by means of said opening means. The opening means may be any means suitable for pinching, piercing or rupturing an outlet face of the capsule. Thereby, the openings means may for example be needles or pins integrally formed with the programming connector. The opening means preferably open the outlet face of the capsule upon association of the programming connector to the respective capsule. Alternatively, the opening means may be designed to open an outlet face of the capsule upon deformation of the programming connector by means of a pressing force onto the programming connector and/or the capsule. Such a pressing force may for example be provided by dedicated enclosing members of a beverage production machine after the capsule and the associated programming connector have been provided to the machine.

According to an embodiment the connector can comprise connection means designed to selectively connect and/or disconnect the connector to/from a rim portion of the capsule.

In the kit the means for mechanically associating the connector to the capsule can comprise at least a snatch member or a connection groove. In the case of a snatch member the connection means preferably comprise two snatch members at opposing side portions of the programming connector or of the capsule in order to enable a stable support of the programming connector adjacent to the capsule when being associated to it. In the case of a connection groove, it is preferably designed for being connected to an outer portion of a face of the capsule such as e.g. a circumferential rim portion of the capsule or to the side of the programming connector. The means for mechanically associating the connector to the capsule can also be an adhesive. Thereby, the connection means may be in the form of a circumferential adhesive film suitable for selectively connecting the programming connector to a face of the capsule. The adhesive film may be equipped with protection means such as e.g. a plastic cover that is to be removed by a user before connecting the programming connector to a face of the capsule. Alternatively, the adhesive may be applied as a separate element to the kit, e.g. in a separate tube. Thereby, the adhesive may be applied by a user before the association of the programming connector to a particular capsule of the kit.

The connection means may as well be any other means suitable for associating the programming connector to a capsule of the kit. The connection means may be designed to selectively connect the programming connector to another portion of the capsule such as e.g. the outlet face of the capsule as described above. Alternatively the connection means may be designed to be selectively connectable to the body or a body portion of the capsule.

The programming connector of the kit is preferably a reusable member. Hence, the programming connector may be separated from the capsules after the beverage preparation process. It is thus reusable for another beverage preparation process with a new capsule. The connecting means can be present on the capsule or on the connector. The connection means are preferably designed to selectively connect and then disconnect the programming connector to and from the capsule. Consequently the user can save the programming connector while the capsule is thrown away. The user can easily wash it e.g. by flushing it with water before re-using it. Actually since the connector does not present inside parts that are contacted by the beverage liquid and non accessible for flushing or cleaning, the hygienic re-use of the connector can be guaranteed.

The means for mechanically associating the programming plate(s) to the capsule(s) of the kit can be a recess set back from the capsule outlet surface for positioning the connector.

The kit may also comprise capsules which are already equipped with identification means such as for example described in EP 1 950 150. Thereby, the programming connector may be specifically designed to be associated to these capsules. Hence, even though the capsules are already equipped with identification means, the programming connector of the kit may be associated to such a capsule in order to customize the beverage to be produced to individual preferences of the consumer with regard to the beverage production parameters.

The programming connector, the capsule and the kit of the invention preferably form a system with a beverage preparation machine such as described hereunder.

The sensing means of the beverage production machine preferably comprise at least one displaceable probe that mechanically contacts the identification member of the programming connector in order to detect information in relation to the degree of displacement of the probe in response of its contact with the identification member. The identification member of the programming connector codes the information in a structural manner by contrast to a visual coding, e.g. by means of a bar code. More precisely, the identification member can comprise a plurality of predetermined localized contact surface receivers, each of them constituting a choice amongst two different surface levels that correspond upon a contact being established or not, with an external sensing means of a beverage production machine, to a binary code state (0 or 1) as outlined in EP 1 950 150. A surface level can correspond, for example, to a difference in depth or height of a plurality of localized recesses/holes or protruding members. Preferably the identification member is coded by modulating a surface structure of the programming connector, e.g. by providing holes or recesses in the second face of the programming connector. The identification member is preferably formed as an integral part of the programming connector. For instance, the programming connector can be made of a moulded plastic onto which the identification member is moulded. For limiting the space required for the detection system, the plurality of predetermined localized contact receivers is arranged on a face of the programming connector in a non-linear pattern. For instance, the receivers can be grouped in a substantially polygonal, star-shaped or curved pattern or a non-regular substantially closed pattern covering the surface of the programming connector. The identification member of the programming connector may be covered by a deformable, displaceable and/or puncturable cover in order to protect it and reduces the risk of misuse or deterioration of the identification system. Thereby, the deformable, displaceable and/or puncturable cover may be sealed or adhered to the face of the programming connector at which the identification member is situated.

The beverage production machine is designed to produce tea, coffee and/or other beverages. Thereby, the beverage production machine comprises at least a liquid respectively a water reservoir, heating means such as e.g. a thermoblock, a pump and injection means for providing heated pressurized liquid to a capsule selectively insertable in a dedicated receiving chamber of the device. The device thus enables the injection of liquid through an inlet face of the capsule, after which the liquid is made to interact with ingredients provided within the capsule. The ejection of the resulting beverage from the capsule is enabled by means of an outlet opening at an outlet face of the capsule. Said outlet opening may be preformed within the capsule and opened during the beverage preparation. Alternatively, the beverage production machine or the programming connector of the system may be equipped with dedicated opening means suitable for providing an outlet opening in the outlet face of the capsule during the beverage preparation process.

In a preferred embodiment, the contacting means of the beverage production machine preferably comprise at least one displaceable probe which mechanically contacts the programming connector, wherein the control means are initially arranged with the at least one probe to detect an information in relation to the degree of displacement of the probe in response of its contact with the programming connector Preferably, the contacting means mechanically contact the identification member that is integrally provided to the programming connector. Thereby, the contacting means can comprise a plurality of movable pins forming a predetermined pattern that mechanically selectively contact predetermined localized surface receivers of the identification member of the programming connector. The control means can be designed to detect the identification information via the degree of displacement of the pin against the identification member. The control means of the system are designed to control, in response to the read information, preparation parameters of the beverage preparation process. Preferably, the control means are designed to control at least the temperature of the provided liquid, the flow rate of liquid provided to the capsule and/or a brewing pause time in response to the read information. The term brewing pause time refers to a pause during the introduction of water in the capsule: water is introduced in the capsule until all the tea leaves are submerged, then water flow is stopped so that the tea leaves can be wetted and can open themselves. This can also be called a "soaking step" corresponding to the brewing pause—then the water is introduced again in the capsule and the tea beverage is delivered.

The programming connector is designed to be associated to the capsule of the system. Hence, the capsule and the associated programming connector may be associated before the beverage preparation process and may thus be provided in their associated state into a dedicated receiving chamber of the beverage production machine. After the beverage preparation process, the capsule is preferably ejected from the receiving chamber of the device to a bin or capsule tray of the beverage production machine. Thereby, the machine may be designed to separate the associated capsule and programming connector and provide solely the used capsule to the bin or capsule tray of the machine. The programming connector may be transferred to a dedicated ejection chamber of the machine from which the user may recollect the programming connector.

Hence, the present invention enables a user to set the operational parameters applied for a specific beverage to be prepared independently of predefined parameters of a beverage production machine. Accordingly, by choosing a programming connector comprising a specific identification member, the consumer is enabled to customize his/her preferences in terms of beverage preparation respectively process parameters like temperature, cup size, strength of the beverage, brewing time, flow rate of the liquid etc., associated to the identification means.

It is to be understood that the term "mechanically contacting" is not limited to the embodiments described herein. It rather encompasses any mechanical interaction of the sensing respectively contacting means of a beverage production machine with the identification means of the programming connector suitable to read information therefrom.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

FIG. 3a-3e and 4a-4b show different preferred embodiments of the programming connector and the capsule of the kit according to the invention using programming connectors according to the first aspect of the invention.

DETAILED DESCRIPTION OF THE FIGURES

Figure 1:
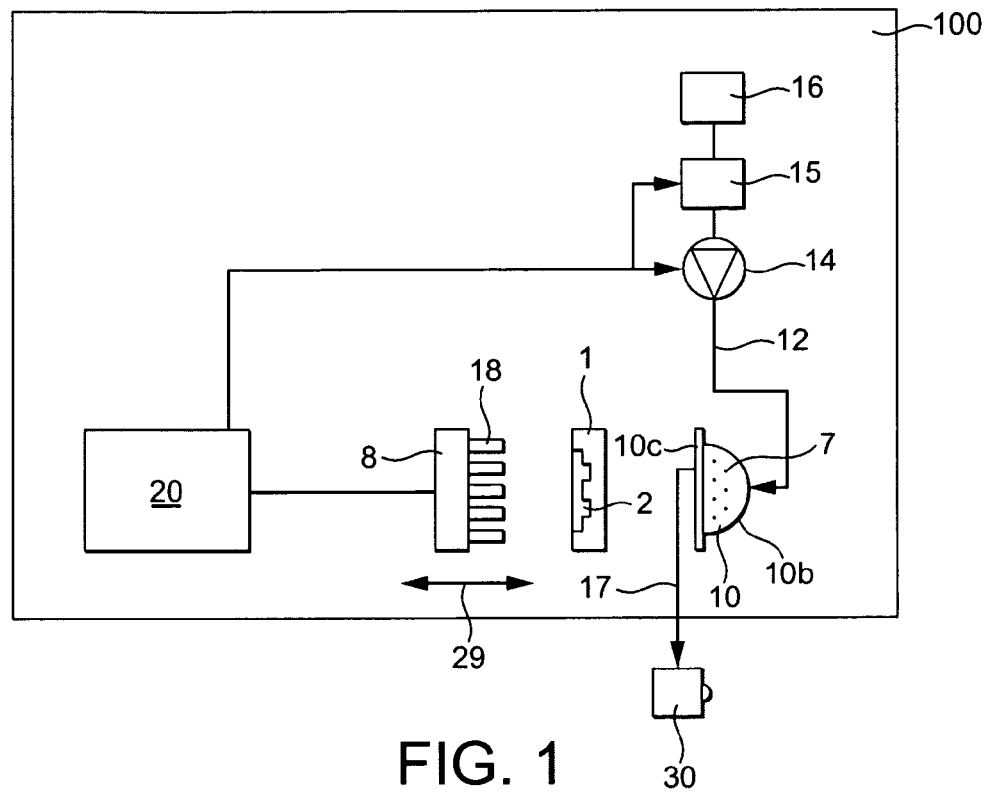
FIG. 1 shows a schematic overview of a beverage production system according to the present invention designed for reading identification information from a beverage production parameter programming connector.

FIG. 1 shows a schematic drawing of the beverage production system according to the present invention. The system comprises a beverage production machine 100 that is designed to produce a beverage from a capsule 10 positioned at a dedicated beverage production position of the beverage production machine 100. As shown in FIG. 1 the capsule 10 has a dedicated compartment for containing beverage ingredients 7.

The beverage production machine 100 further comprises a pump 14 and a boiler or thermoblock 15 which are preferably both connected to a liquid supply 16 of the beverage production machine 100. The liquid supply 16 preferably holds a predefined amount of liquid such as e.g. water.

During the beverage production process, liquid 12, controlled by a control means 20 of the beverage production machine 100, is made to enter the capsule 10 through an inlet face 10b of the capsule 10 in order to interact with the ingredients 7 contained therein. The result of the interaction, i.e. a produced beverage or liquid comestible 17 is then ejected via an outlet face 10c of the capsule 10 and can then be obtained from the beverage production machine 100.

Typical examples for the nature of the interaction between the liquid 12 and the ingredients 7 is brewing, mixing, extracting, dissolving, etc.

The beverage production machine 100 further comprises contacting respectively sensing means 8 which are functionally connected to the control means 20 of the beverage production machine 100 and which are designed for mechanically contacting an identification member 2 of a programming connector 1 in order to read information thereof. Thereby, the contacting respectively sensing means 8 comprise probe means 18 which are designed to read the information coded preferably by modulating the surface structure of the identification member 2 of programming connector 1. Preferably such detection is carried out by means of a physical mechanical contact or an electric contact, although as surface modulation can also be read optically. The probe means 18 are preferably a plurality of displaceable pins, which during the information reading process are biased against the identification member 2 of the programming connector 1. Thereby, depending on the specific shape of the surface structure of the identification member 2 at a contact area between a pin 18 in the identification member 2, a pin 18 will thus be allowed to protrude more or less towards the programming connector 1. In case the information is coded in digital manner by the surface structure of the identification member 2, correspondingly also there will be a digital encoding of the displacement positions of the pins 18, i.e. there will only be a more protruding and a less protruding position for the pins 18. This relative displacement of the pins 18 is converted into electrical signals by a detection unit (not shown). The thus generated electrical detection signals can then be processed by the control unit 20.

The programming connector 1 is preferably provided to the beverage production machine 100 before the beverage preparation process. Thereby, the programming connector 1 is preferably designed to be connected to the capsule 10.

The control means 20 are at least functionally connected to the thermoblock 15 and the pump 14 of the device. Accordingly, the control means 20 are designed to control and adapt the beverage production parameters of the machine 100 during the beverage preparation process. Examples for parameters to be controlled by the control means 20 are the water temperature, flow rate and/or pause times of the brewing process of a tea or other beverage to be prepared by the machine. Thereby the control means 20 are designed to adapt and/or vary the beverage production parameters dependent on the provided information from the programming connector 1, in particular dependent on the information read by means of the sensing means 8 from the identification member 2 of the programming connector 1. Preferably, the control unit 20 is designed such that in case it retrieves information of the identification member 2 of the programming connector 1, it controls the operation of at least the following production cycle of the beverage production machine 100 depending on the content of the date read from the identification member 2. It is to be understood that the data carried by the programming connector can refer to parameters of the capsule and/or the ingredients contained therein. Moreover, the data can refer to further data of the beverage preparation process or system parameters of the beverage production machine 100.

Furthermore, the beverage production machine 100 preferably comprises means 29 for selectively bringing into contact the contacting means 8 and the programming connector 1 after the provision of the programming connector 1 to the beverage production machine 100.

Figure 2:
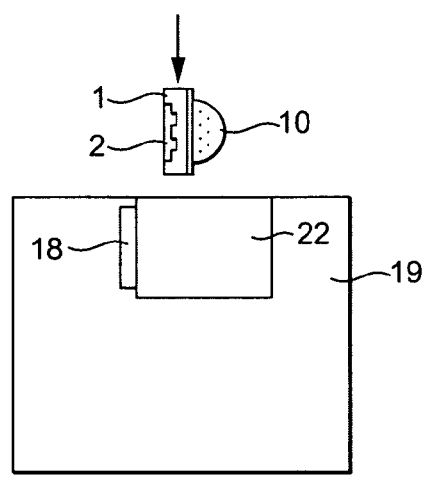
FIG. 2 shows schematic drawings of an extraction head of a beverage production machine according to the present invention.

FIG. 2 describes the extraction head 19 of the beverage production machine 100 comprising a receiving chamber 22 being designed to receive both the capsule 10 and the programming connector 1. Thereby, the programming connector 1 and the capsule 10 are preferably associated by a user before insertion to the receiving chamber 22.

The receiving chamber 22 is preferably at least partially defined by one or two enclosing members (not shown) of the extraction head 19 of the machine 100 which are designed to be brought from a first capsule insertion position to a second capsule enclosing position, thereby tightly enclosing the capsule within the receiving chamber 22 of the machine 100. Thereby, the enclosing members may be at least provided with an injection means designed to pierce an inlet face 10b of the capsule 10 when the capsule is enclosed by the enclosing members in order to inject liquid 12 to the capsule.

Accordingly, the contacting means 18 in this embodiment are preferably associated to the receiving chamber 22 of the extraction head 19 in order to contact the identification member 2 of the programming connector 1 after the programming connector 1 and the capsule have been inserted into the receiving chamber 22a. Hence, both the capsule 10 and the programming connector 1 are insertable in the brewing chamber 22, preferably in an already associated state.

After the beverage preparation process, both the capsule 10 and the associated programming connector 1 may be transported by the beverage production machine 100 from the receiving chamber 22 to a capsule bin or tray of the machine 100.

In an alternative embodiment, separation means (not shown) may be provided within the receiving chamber 22 in order to separate the capsule 10 and the programming connector 1 and thus transport only the capsule 10 to the capsule bin or tray of the machine 100. The programming connector 1 may then stay within the receiving chamber 22 of the extraction head 19 or be transferred to an additional tray of the beverage production machine 100 from which the user is able to recollect the programming connector 1.

FIG. 3a shows a front view of the programming connector 1. As shown in FIG. 3a, the programming connector 1 comprises a first side or first face respectively front face 1a opposite to a second side or face 1b (see FIG. 3b) thereof, on which the identification member 2 is arranged. The information stored by the identification member 2 of the programming connector 1 is preferably coded in a digital manner. Thereby, the surface structure 5a of the identification member 2 is modulated by providing selectively a plurality of holes or recesses 23. Having a hole respectively a recess 23 at a predefined position represents one logical state (e.g. "0"), while not having the hole at the same position would represent respectively another digitally coded state (e.g. "1").

The identification member 2 is preferably arranged at a central portion 25 of the face 1a of the capsule 10. However, the identification member 2 may as well be arranged at an outer respectively at a rim portion of the face 1a of the programming connector 1.

A detailed description of the reading process from the identification member 2 by means of the sensing respectively contacting means 18 of the beverage production machine 100 is given in EP 1 950 150.

It should be noted that the general geometrical form of the programming connector 1—when seen in front view—is preferably chosen to prevent a user from inserting the programming connector into the beverage production machine 100 in wrong orientation. The programming connector 1 may for example be of essentially triangular or frustoconical form. Alternatively, the programming connector may be of essentially rectangular or squared form with slanted side portions. Moreover, the programming connector 1 may as well be of circular geometrical form.

FIGS. 3b and 3c show respectively a sectional side view and a back view of a programming connector 1 according to the present invention. FIG. 3d shows the association of the capsule and the programming connector. The programming connector 1 may comprise guiding means 24 arranged at the outer circumference of the connector 1 as shown in the FIG. 3b. Thereby, the guiding means 24 is preferably a protruding rip or a recessed groove. The guiding means 24 may be different on each side of the connector 1 in order to prevent a user from inserting the connector 1 into the beverage production machine 100 in wrong orientation.

As shown in FIG. 3b, the programming connector 1 may optionally comprise opening means 4 which are arranged at the second face or side 1b of the connector 1. The opening means 4 are preferably designed to create an opening in a face near a top portion of the capsule to be associated to the connector 1. Hence, an overflow aperture within the capsule from which the resulting beverage may be drained can be provided by means of said opening means 4.

Said second face or side 1b is preferably designed to be selectively associated to an outlet face 10c of a capsule 10 containing ingredients. Therefore, the second face or side 1b of the connector 1 preferably can comprise connection means 3a designed for establishing a connection with an outlet face 10c of a capsule 10.

According to an alternative, the connection means for associating the programming connector to the capsule can be present on the capsule as further illustrated in FIG. 4: in that case the programming plate does not have to comprise connection means 3a.

As shown in FIGS. 3b, 3c and 3d, the connection means 3a may be a connection groove that is designed for being connected to an outer portion of a face of the capsule such as e.g. a circumferential rim portion 10a of the capsule. A user is thus enabled to simply slide the programming connector 1 onto the rim portion 10a of the capsule as shown in FIG. 3d (associated state of the capsule 10 and the programming connector 1).

Thereby, the opening means 4 which is preferably at least one piercing member is arranged within a recess 27 of the programming connector such that the piercing member does not protrude from face 1b. Accordingly, a user may easily slide the programming connector 1 onto the capsule 10 within rupturing the outlet face 10c of the capsule 10. Then, in order to create an outlet opening in the face 10c of the capsule 10, the user may gently push the programming connector 1 and thus the piercing element 4 against the capsule 10. As an alternative, the pushing force necessary to produce an outlet opening in the outlet face 10c of the capsule 10 may be exerted by the beverage production machine 100 after the insertion of the capsule 10 with the associated programming connector 1.

Figure 3E:
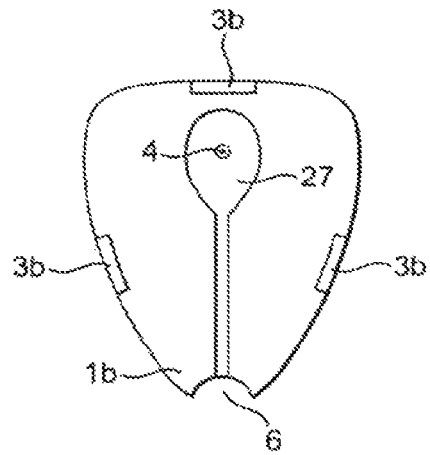

In another preferred embodiment as shown in FIG. 3e, the connection means may be snatch members 3b which are designed to be clipped to a flange-like rim portion 10a of the capsule 10. Thereby, the snatch members 3b are preferably arranged at an outer circumferential rim portion of the programming connector 1 as shown in FIG. 3e. The snatch members 3b are preferably designed to easily enable a user to connect or disconnect the programming connector 1 to a given capsule 10 of a provided kit according to the invention.

It should be understood that in said preferred embodiment, the optional opening means 4 of the programming connector 1 are preferably protruding from the second face 1b of the connector 1. Accordingly, an outlet opening can be established in the outlet face 10c of the capsule upon connection of the programming connector 1 with the capsule 10. However, the opening means 4 may as well be arranged in a recess in order to prevent a user from piercing himself during handling of the programming connector 1.

Generally the opening means 4 may be any means suitable for pinching, piercing or rupturing an outlet face 10c of the capsule 10. Thereby, the openings means 4 may for example be a piercing member such as a needle or a pin integrally formed within the second face or side 1b of the programming connector 1 respectively integrally formed within a recess 27 formed within the face or side 1b of the capsule 10.

The programming connector 1 further comprises an outlet 6 provided at a lower circumferential portion of the connector 1 such that the beverage drained from the outlet face 10c of the capsule 10 is enabled to flow from the space between the associated capsule 10 and the programming connector 1 to the outside of the arrangement. Thereby, the outlet 6 is preferably in fluid connection to the provided recess 27 in order to effectively enable a liquid to flow from an aperture created in the outlet face 10c of a capsule 10 to the outlet 6 (FIG. 3e).

Hence, a receptacle 30 can be placed under the associated capsule 10 and programming connector 1 in order to collect the resulting beverage from the machine 100 (see FIG. 1).

Figure 4A:
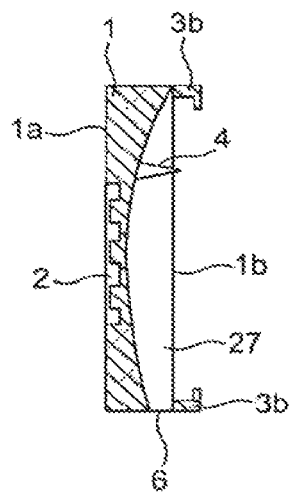
Figure 4B:
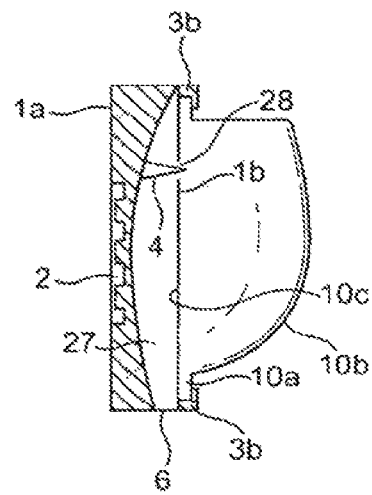

FIGS. 4a and 4b relate to another preferred embodiment of the programming connector and the kit according to the present invention. Thereby, FIG. 4a shows a sectional side view of the programming connector 1 being equipped with optional opening means 4 which are protruding from second side 1b of the programming connector 1. The programming connector 1 comprises at least two snatch members 3b which are designed for enabling an association of the programming connector 1 to a given capsule 10 of the kit. Thereby, the snatch members 3b preferably engage with an outer circumferential flange-like rim portion 10a of the capsule 10 (see FIG. 4b).

In the associated state as shown in FIG. 4b, the programming connector 1 is clipped with its second face 1b to an outlet face 10c of a capsule 10. Thereby, the opening means 4 protrudes through the outlet face 10c such that an outlet aperture 28 is created in the outlet face. Preferably, the opening means 4 is arranged such that the outlet aperture 28 is created in an upper section of the outlet face 10c relative to its orientation within the beverage production machine 10 in order to provide a suitable overflow aperture from which the beverage can be drained. The resulting beverage is then evacuated from the space 27 between the capsule 10 and the programming connector 1 through outlet 6 provided at a lower portion of the programming connector 1.

FIGS. 5a-5c and 5i illustrates different embodiments of a capsule 10 according to the second aspect of the invention.

Figure 5A:
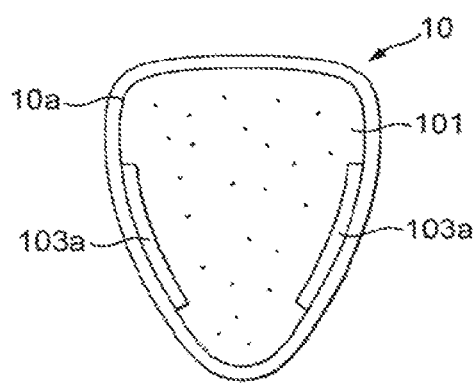
FIG. 5a-5i show different preferred embodiments of the programming connector and the capsule of the kit according to the invention using capsules according to the second aspect of the invention.

In FIG. 5a the capsule outlet face is closed by a filter 101 and the capsule presents two connection grooves 103a for sliding a programming connector in them and associating it to the capsule.

Figure 5B:
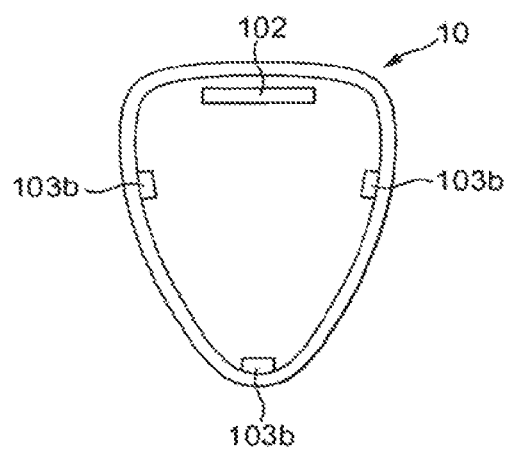

In FIG. 5b the capsule outlet face is closed but presents an overflow aperture 102 and the capsule presents three snatch members 103b for clipping a programming connector through them and associating it to the capsule.

Figure 5C:
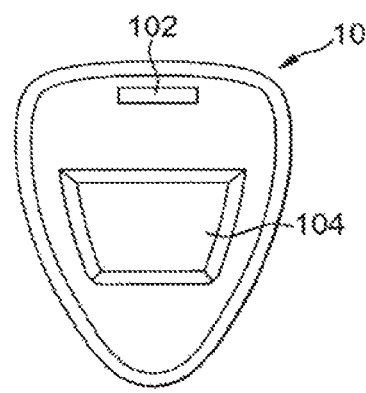

In FIG. 5c the capsule outlet face is closed but presents an overflow aperture 102 and the capsule presents a recess 104 for positioning a programming connector in it and associating it to the capsule.

Figure 5D:
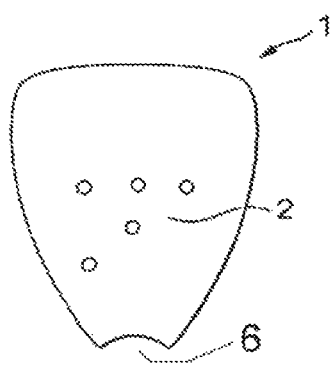
Figure 5E:
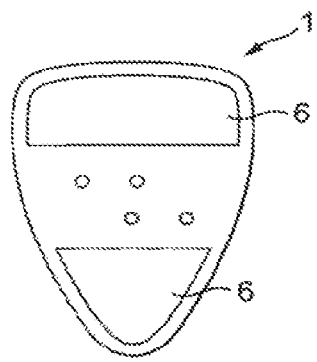
Figure 5F:
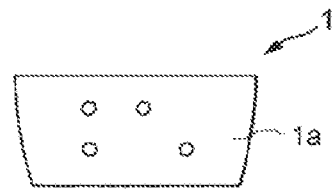
Figure 5G:
Figure 5H:
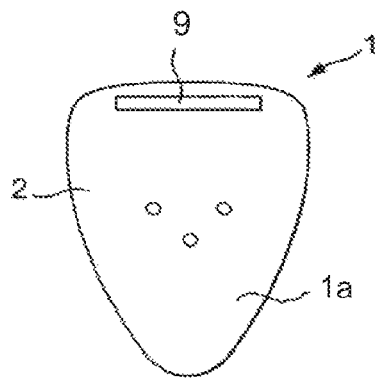
Figure 5I:
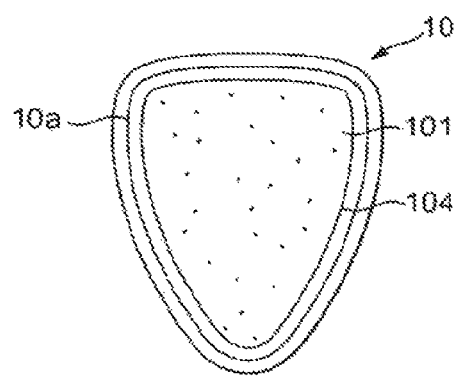

In FIG. 5i the capsule outlet face presents a recess 104 for positioning a programming connector in it and associating it to the capsule. The bottom of the recess is made of filter 101.

According to the invention, each of the overflow aperture and the filter can be associates to the different means for associating the connector to the capsule that is as well the clipping or snatching members or the recess.

FIGS. 5d-5g illustrates different embodiments of a programming connector 1 that can be associated to the capsules 10 of FIGS. 5a-5c. FIG. 5d shows the first side 1a of a connector; the connector 1 is a simple plate presenting on its first side the identification member 2. It presents a hollowing out 6 at its bottom part (bottom according to the sense of use in the machine) to enable the evacuation of the prepared beverage. This connector can be associated to the capsules 10 of FIG. 5a or 5b to form a kit. The other side of the connector 1 of FIG. 5d does not need to comprise opening means if the associated capsules are not totally closed (like in FIG. 5a or 5b). This second side can only present a recess or grooves for enabling the evacuation of the beverage until the hollowing out 6. Otherwise opening means can be added.

FIG. 5e shows the first side 1a of another connector; the connector 1 is a simple plate presenting on its first side the identification member 2. It presents two important hollowing outs 6 in the parts of the plate that do not support the identification member 2. These hollowing outs enable the saving of material during manufacture of the connector and to save costs. Besides the hollowing out at the bottom part (bottom according to the sense of use in the machine) enable the evacuation of the prepared beverage. This connector can be associated to the capsules 10 of FIG. 5a or 5b to form a kit.

FIG. 5f shows the first side 1a of another connector; the connector 1 is a simple plate limited to the size of the identification member 2. Its lateral size is sufficient so as to enable its clipping in the two upper snatching members 103b of the capsule 10 of FIG. 5b. Consequently a kit can be based on capsules of FIG. 5b and connectors of FIG. 5f.

FIG. 5g shows the first side 1a of another connector similar to the connector of FIG. 5f except that it presents a smaller lateral size. Its size is sufficient so as to enable its positioning in the recess 104 of the capsule 10 of FIG. 5c. Consequently a kit can be based on capsules of FIG. 5c and connectors of FIG. 5g.F FIG. 5h shows the first side 1a of a connector; the connector 1 is a simple plate presenting on its first side the identification member 2. It presents a traversing hole 9 at its upper part (upper according to the sense of use in the machine) to enable the evacuation of the prepared beverage. This connector can be associated to the capsules 10 of FIG. 5a or 5b to form a kit. The other side of the connector 1 of FIG. 5d does not need to comprise opening means if the associated capsules are not totally closed (like in FIG. 5a or 5b). Otherwise an opening means can be added. The connector of FIG. 5h can also be associated to the capsules 10 of FIG. 5i to form a kit by placing the connector 1 in the corresponding recess 104 of the capsule. The other side of the connector 1 of FIG. 5d does not need to comprise opening means since the outlet face at the bottom of the recess 104 is a filter 101.

The invention claimed is:

1. A beverage production parameter programming connector comprising:
   a connection member for mechanically associating the connector to an outlet face of a capsule containing beverage ingredients, the connection member is selected from the group consisting of a snatch member, a connection groove, and an adhesive; and
   an identification member placed on a first side of the connector designed for representing individual information as to beverage production parameters upon mechanical contact by a sensor of a beverage production machine, the first side of the connector is opposite to a second connector side comprising the connection member, the identification member presents a first face and a second face, the second face presents a modulated surface, and the modulated surface codes the identification member.

2. The beverage production parameter programming connector of claim 1 comprising a traversing hole or a hollowing out for enabling beverage prepared in the capsule to pass the connector and to be delivered to a receptacle.

3. The beverage production parameter programming connector of claim 1, wherein the connector surface does not cover the whole capsule outlet face.

4. The beverage production parameter programming connector of claim 1, wherein the connector comprises an opener located at the second connector side for opening the outlet face of a capsule.

5. A kit comprising:
   at least a capsule for insertion in a beverage production machine and containing beverage ingredients, the capsule having a cup-like base body comprising an outlet face, and
   one or more beverage production parameter programming connector(s) comprising an identification member placed on a first side of the connector designed for representing individual information as to beverage production parameters upon mechanical contact by a sensor of a beverage production machine, the first side of the connector is opposite to a second connector side designed for connection to the outlet face of the capsule, and
   either the capsule or the connector or both are provided with a member configured for mechanically associating the connector to the capsule by the consumer.

6. The kit of claim 5, wherein the outlet face of the capsule comprises at least one hole for evacuating the beverage from the capsule.

7. The kit of claim 5, wherein the outlet face of the capsule is a filter or a connector and has at least one overflow aperture.

8. The kit of claim 5, wherein the connector is a separate element from the capsule designed to be selectively applicable to the capsule.

9. The kit of claim 5, wherein the connector comprises a traversing hole or a hollowing out for enabling beverage prepared in the capsule to pass the connector and to be delivered.

10. The kit of claim 5, wherein the connector surface does not cover the whole capsule outlet face.

11. The kit of claim 5, wherein the connector comprises an opener provided at a second connector side suitable for opening the outlet face of a capsule.

12. The kit of claim 5, wherein the connector is designed to provide an adjustable program independent of the capsule size, ingredients of the capsule and/or predefined beverage production parameters of a beverage production machine to be used for the beverage preparation in conjunction with the capsule.

13. The kit of claim 5, wherein the connector comprises a connection member designed to selectively connect and/or disconnect the connector to/from a rim portion of the capsule.

14. The kit of claim 5, wherein the member for mechanically associating the connector to the capsule comprises at least a snatch member or a connection groove.

15. The kit of claim 5, wherein the member for mechanically associating the connector to the capsule is an adhesive.

16. The kit of claim 5, wherein the outlet face of the capsule presents a recess set back from the capsule outlet surface for positioning the connector.

* * * * *